US006772049B2

(12) United States Patent
Choi

(10) Patent No.: US 6,772,049 B2
(45) Date of Patent: Aug. 3, 2004

(54) CENTRALIZED AUTOMATIC ENERGY CONTROL SYSTEM

(75) Inventor: Sang J. Choi, 2425 W. 183rd. St. Apt. A, Homewood, IL (US) 60430

(73) Assignee: Sang J. Choi, Homewood, IL (US)

( * ) Notice: Subject to any disclaimer, the term of this patent is extended or adjusted under 35 U.S.C. 154(b) by 180 days.

(21) Appl. No.: 10/081,957

(22) Filed: Feb. 25, 2002

(65) Prior Publication Data

US 2003/0163222 A1 Aug. 28, 2003

(51) Int. Cl.$^7$ ............................................. G05D 23/00
(52) U.S. Cl. ....................... 700/277; 340/567; 700/299; 700/17; 700/83
(58) Field of Search ............................. 700/277, 278, 700/276, 299, 300, 83, 17; 340/540, 528, 522; 165/120, 209; 236/47; 210/201–265

(56) References Cited

U.S. PATENT DOCUMENTS

| | | | | |
|---|---|---|---|---|
| 4,552,999 A | * | 11/1985 | Annas | ........................ 200/34 |
| 5,318,224 A | * | 6/1994 | Darby et al. | ................... 236/47 |
| 5,475,364 A | * | 12/1995 | Kenet | ......................... 340/522 |
| 5,640,153 A | * | 6/1997 | Hildebrand et al. | ......... 340/7.1 |
| 5,682,949 A | * | 11/1997 | Ratcliffe et al. | ............ 165/209 |
| 6,351,693 B1 | * | 2/2002 | Monie et al. | ............... 700/299 |

* cited by examiner

*Primary Examiner*—Leo Picard
*Assistant Examiner*—Kidest Bahta

(57) ABSTRACT

For a facility, such as hotels, motels, or apartments, energy expenses especially for air conditioning, heating and room lighting are one of major concerns of the management. This invention is pertaining to how to save the electricity usage by effectively controlling room lighting sand temperatures, from the front office.

In a hotel/motel environment, when a office clerk checks out a guest from a room, the room is automatically put in vacant status and, of which unnecessary lights are turned off, temperature is adjusted to the preset vacant level, and the room indicator LED is off showing that the room is vacant. When a new guest is checked in, the process is just opposite, turning the room indicator LED on, all lights are enabled to turn on, and temperature is adjusted to the preset occupied level for the room. Since this invention uses the existing telephone lines to control the room devices automatically from the front office, no extra wiring from room to room are needed for the communication.

3 Claims, 13 Drawing Sheets

LED MATRIX

It is unpredictable where the sequence reached here from, however, when this procedure is finished, it will return to where it comes from.

CENTRALIZED AUTOMATIC ENERGY CONTROL SYSTEM

FEDERALLY SPONSORED RESEARCH OR DEVELOPMENT

Not applicable

MICROFICHE APPENDIX

BACKGROUND OF THE INVENTION

Many prior arts have dealt with the thermostat improvement for air conditioning and heating systems, however, the most of them are trying to make the thermostat system more effective for individual room units. Since the advent of microprocessor and microcontroller, many microprocessor based temperature control systems have emerged for multi room facilities such as hotels, motels and apartment buildings. The most important factor for producing a new product is the marketability in the targeted field. To that end, the product should be reliable for the objectives, economical to produce and maintain, easy to use and install (such devices as temperature control system), and durable to meet the objectives. Some prior arts have very extensive and versatile functionality but they are very complex to use, maintain, and install them. Some prior inventions are quite simple to use them but have very limited versatility.

The U.S. Pat. No. 5,682,949, describes a energy saving system for hotel and motel facilities, which connects all rooms serially by wiring them for signal or data communications. The system includes a computer for central control and operation, master nodes and local nodes for intermediate control, and slave nodes, which are thermostat. The art seems bearing following shortcomings (1) wiring to all rooms require materials and technical labor, (2) extra devices for local nodes and master nodes bears more expenses, (3) since slave nodes are connected serially, each node should have it's own address different from others and should be configured separately. When a node goes bad, an ordinary technician can not just buy one and replace it with a defected one. It should be done by somebody who knows the procedure how to configure the address of the node. (4) Only trained person can install and configure the system, not by the hotel technician or maintenance man. (5) System users, in this case front desk clerk, should go through an extensive training program to learn how to use the system including the computer. (6) On the serially connected loop of rooms, if at any point, connection is damaged or broken, the rooms connected after that point can not be controlled by the central control device. As of the U.S. Pat. No. 5,318,224, the prior art utilizes telephone communication system to remotely control a heating system, however, it's remote control functionally, according to the specification and drawings of the art, is limited only to turning on or off the heating system. It does not describe anything about the specifics on the remote-controlling device, which seems a telephone unit. To effectively control the energy usage, the prior art is employing different levels of temperature settings based on the status of a room whether the room is occupied or unoccupied. The status is determined locally by a motion detector, which monitors a movement inside the room indicating that the room is occupied. According to the specifications and drawings, the art does not seem having manual control means for the temperature limiting setting instead it has a heating time control feature. Preset temperature values 65 degrees and 45 degrees are mentioned, but those values seem loaded by the program. If a circumstance arises to change those values, the change should be done in the program, which requires time and effort. A/D converter and temperature sensor circuits can be replaced by one chip, which embeds A/D converter into a new temperature sensor, which arrangement can save space, cost, and labor time. The U.S. Pat. No. 4,552,999, titled "Telephone Activation Apparatus" improved the heating and air conditioning control system by adding remotely activating features to it. The feature can only turn heating/cooling system on or off, and is not much beneficial to the hotel or motel management.

The objective of the present invention is to control the energy consumption more effectively for a hotel/motel facility by adding the followings specified in the summary section.

SUMMARY OF THE INVENTION

The present invention is aimed at providing an efficient multifunctional energy control system for hotel and motel facilities where the energy expenses account for large percent of their facility operating budgets. As part of overall plans to meet the above objectives for this invention, a central controller located in the front office assumes important role to implement various controls for all rooms uniformly. By maintaining individual room's list of occupancy status whether a room is occupied or vacant, the central controller can set different level of maximum or minimum temperature setting based on them.

When a guest check out of a room, the desk clerk presses keys for the room number and "OUT" key on the central controller board, then following will happen: (1) an LED representing the room number is turned off, (2) the preset temperature limit number stored in the microcontroller of the central controller is downloaded into the memory of the local controller box in said room from where it controls heater or air conditioner, (3) it will also turn off the LED on the local controller box, signaling that the room is vacant.

When a maid finishes cleaning of the room and pushes the ready button of the local controller box in the room, (1) it will turn on the LED in the room and the LED representing the room on the LED Matrix Board in the central office, in green color, this signifies the room is ready to sell.

When the desk clerk checks in a guest into a room, the clerk pushes appropriate keys for the room number and pushes the "In" button on the central controller board, the followings will happen:

(1) Both statuses LEDS, one on the local controller box in the room and one on the LED Matrix section on the central controller in the front office turn on in red color, signing that the room is occupied.

(2) The preset limit temperature value stored in the memory of the central control board is downloaded into the memory of the local controller box in the room, which is actually controlling temperature of the room.

For all the operations described above, what the front desk clerks have to know is using keypad to select a room number and "IN" key or "OUT" key to distinguish whether the room is checked in or checked out. All the rest of the activities are performed automatically and remotely by the two microcontrollers, one on the central controller board and one on the local controller box.

If a situation arises where it is necessary to change the preset limit temperature, possibly due to the weather changes or seasonal changes, maintenance man or a manager would do this operation most likely. Whoever doing this task would just push "UPDATE" button on the central controller board, then type in 2 digits representing the new desired limit value for occupied status in Fahrenheit and followed by another 2 digits for vacant status. Hysteresis values are automatically calculated by the microcontroller. Those 2 values are kept in the memory of the microcontroller in the central controller board.

Whenever a room is checked in or checked out, the appropriate value is downloaded instantly into the microcontroller memory in the local controller box of the room, this downloaded preset limit value is compared with the actual ambient temperature value read by the temperature sensor device. If the difference is significant enough to exceed the hysteresis value, it will activate the appropriate heating or cooling unit to adjust the temperature toward the preset limit value.

As explained so far, the functions of the central controller are performed either by desk clerks or maintenance person.

As for the local controller, the preset limit temperature values and the room occupied status data are downloaded from the central controller. However, this invention allows guests to adjust the preset limit value with the increase and decrease button switches on the local controller box in the room. Every time the "UP" arrow button is pushed, the limit temperature value is incremented by one degree from the previously set value. The "DOWN" arrow button brings just the opposite result. When room cleaning is finished, a house-keeper or head house keeper will pushes the "READY" button enabling the room lighting and notifying the front office that the room is ready to sell. This procedure also changes the color of both statuses LEDS in green color.

For FIG. 6 through FIG. 16, refer to the detailed description of the preferred embodiment section.

DETAILED DESCRIPTION OF THE PREFERRED EMBODIMENT

This invention is pertaining to efficient energy management system in a hotel, motel, or apartment facilities. The main objectives are to produce a system which is easy to use, economical to adapt and operate, and having useful and necessary functions for the management of a business entity such as hotel or motel with multi room operation.

The main features of this invention are to control each room's energy (temperature and lighting) automatically from the central office location.

Figure 1:
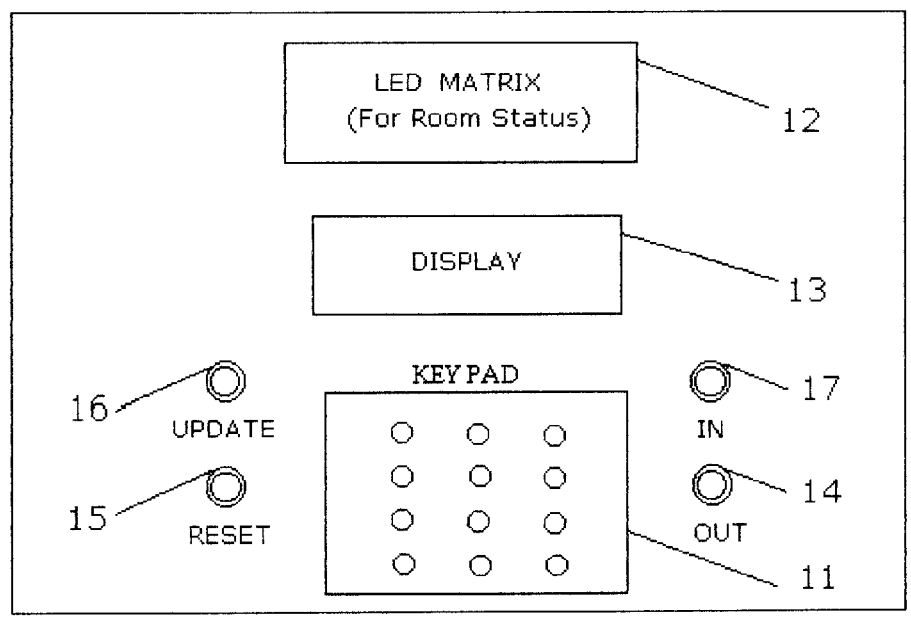
FIG. 1 is a physical layout diagram for the central controller board in relating to a preferred embodiment of the present invention.
Figure 2:
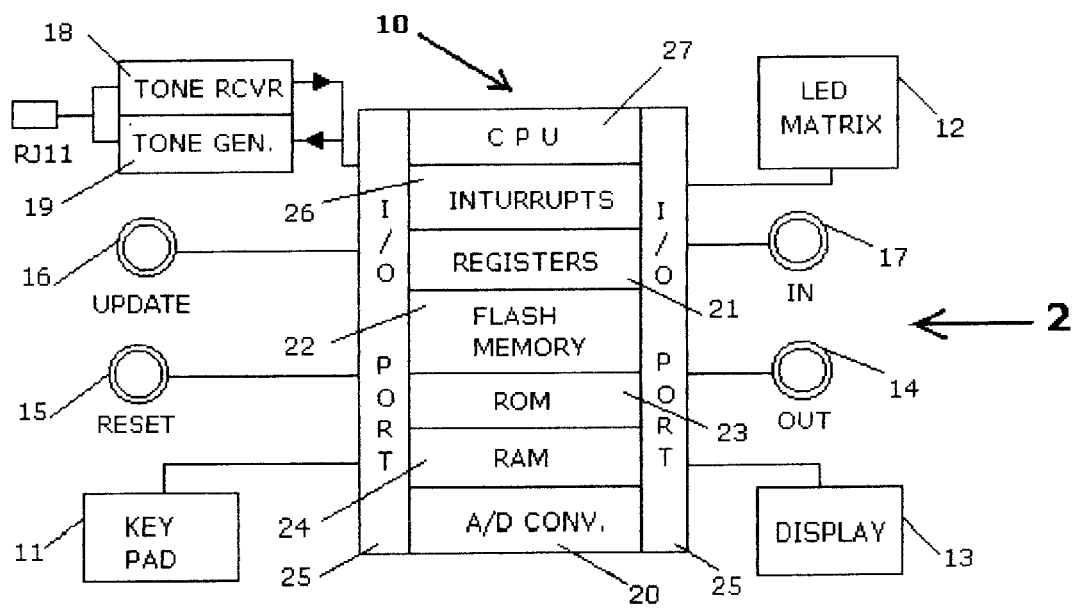
FIG. 2 is a functional block diagram for the central controller board located in the front office.

FIG. 1 and FIG. 2 are showing the same device in different perspectives. FIG. 1 shows the physical layout of the central controller board (2) and FIG. 2 is the functional diagram for the same device. The controller board (2) has four functional switch buttons, "IN" (17), "OUT" (14), "UPDATE" (16), "RESET" (15) switches. Providing those switch buttons, instead of using part of keypad keys, will help the operators (desk clerk and maintenance man) for easier access the switches because they are distinctively different compared with keypad keys. When the power (switch is not shown) is turned on, the controller is waiting for a functional switch button being pressed. If the "IN" button (17) is pressed, the "CHECK IN" procedure is followed.

A desk clerk types in a three digit room number, then the system automatically put the room in "Occupied Status" and turn on the LED (12) representing the numbered room in red color, and transmit the preset limit temperature value of the occupied status.

If the "OUT" button (14) is pressed, the "CHECK OUT" procedure is followed. The clerk type in a three digit room number, then the system automatically put the room in "VACANT STATUS" and turn off the LED (12), transmit the room number and the preset limit temperature value of the vacant status through the tone generator (19).

If the "UPDATE" button (16) is pressed, updating preset limit temperature value procedure is followed. The hotel/motel manager or maintenance person will set the new values for the preset limit temperature of the occupied status and vacant status. Those limit temperature values will be transmitted to the respective room when a guest is checked into a room. If the "RESET" button is pressed, it initiates the reset procedure configuring all necessary initial settings.

The key pad (11) comprises 4×3 12 keys which are used to input the room numbers during "CHECK IN" and "CHECK OUT", also used to input preset limit temperature values of occupied status and vacant status during updating operation.

Display unit (13) is LCD (Liquid Crystal Display) with the associated driver circuits, normally showing "Occupied Preset Limit Temperature value" and "Vacant Preset Limit Temperature Value", both in Fahrenheit. However, it will also display the typed room number during "CHECK IN" and "CHECK OUT" operation. Soon after aforementioned operation, it will return back to the normal display showing the preset limit temperature values.

The LED Matrix (12) includes 100 LEDS (10×10) for 100 room facilities as an example for this invention. This would be increased for the larger facilities and decreased for the smaller operations. Each LED represents one room showing the room's status whether it is occupied, just checked out, or cleaned and ready to sell with red color, off color or green color respectively. Red color or off color are set or cleared automatically by the desk clerk during "CHECK IN" or "CHECK OUT" operation and green color is set by the room maid or head housekeeper during the status report by pressing the "READY" button on the local controller box in the room.

During check in or check out procedure, the preset limit temperature stored in the either RAM or flash memory is outputted through I/O port (25) to the encoder (19) which converts digital format data to touch tone DTMF signal format. The DTMF signal is transmitted through the RJ11 connector to the local controller in the room via telephone lines. National semiconductor IC chip TP 5088 tone generator can be used for this purpose.

The tone receiver (19) circuits receives the DTMF (Double Tone Multi Frequency) tone signal from a local controller through the RJ11 connector via telephone line and convert it into digital format data. Motorolla's MC15436 IC chip can be used for this circuit.

A/D converter feature (20) is embedded into the microcontroller, it will convert any analog voltage into digital value. All the connections to the external devices will be linked through the I/O Port (25). Registers (20) are used for holding data temporarily during the manipulation of the data.

Flash memory (22) is used as data storage area semi permanently. It does not loose the contents even during the power loss, however, the contents of the memory can be changed by writing in a new data. Therefore, semi permanent data type, like limit temperature values would be stored there because those data are not changed very often.

ROM (Read Only Memory) (23) is the place where permanent data or program can be stored. The contents written in the memory can not be changed in the circuits.

RAM (Random Access Memory) (24) is the kind of memory where temporary data can be stored. However, it loses the contents whenever power is removed from the device. In a microcontroller the amount of RAM (24) memory is usually very limited, therefore programs are not stored in this type of memory. Some temporary data, such as limit temperature value or actual temperature value read by the temperature sensor, are stored in the RAM during the manipulation to get the control voltage.

When tone receiver (18) receives ringing signal, it requests interrupt to the CPU (Central Processing Unit) (27) of the microcontroller (10), the CPU (27) calls for the interrupt service routine. Which receives the incoming data and checks whether the data is a valid address, if it is so, then updates the status of the room as a clean room and turn on the LED (12) for the room with green color. At the central controller (2), 5 events, check in, check out, update, reset, and the received signal from the local controllers, requires an appropriate response from the microcontroller. First 4 events are polled continuously by the microcontroller. But the last event is initiated by the interrupt procedure, because the CPU (27) does not know when this event will occur. The CPU (27) does not pay any attention to this communication event. When a room controller is sending "READY" signal through tone generator, the central controller receives this signal and requests interrupt. Upon receiving this request, the CPU (27) responds and takes appropriate action, in this case, updating the room status.

Figure 3:
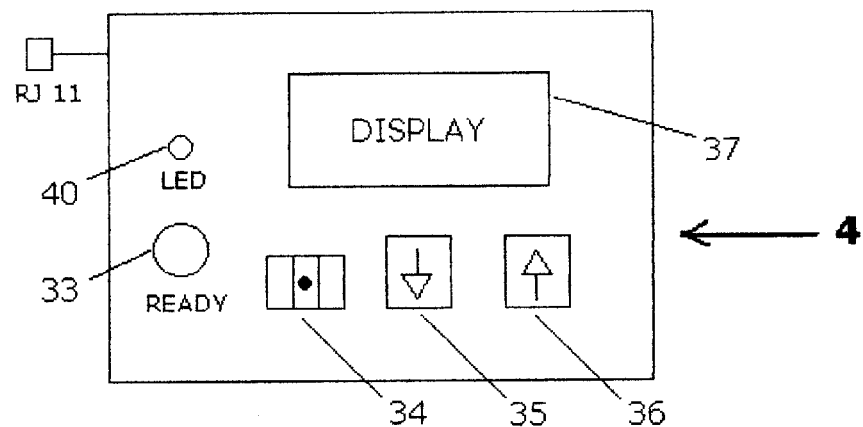
FIG. 3 is a physical layout diagram for the local controller box located in the each individual room.
Figure 4:
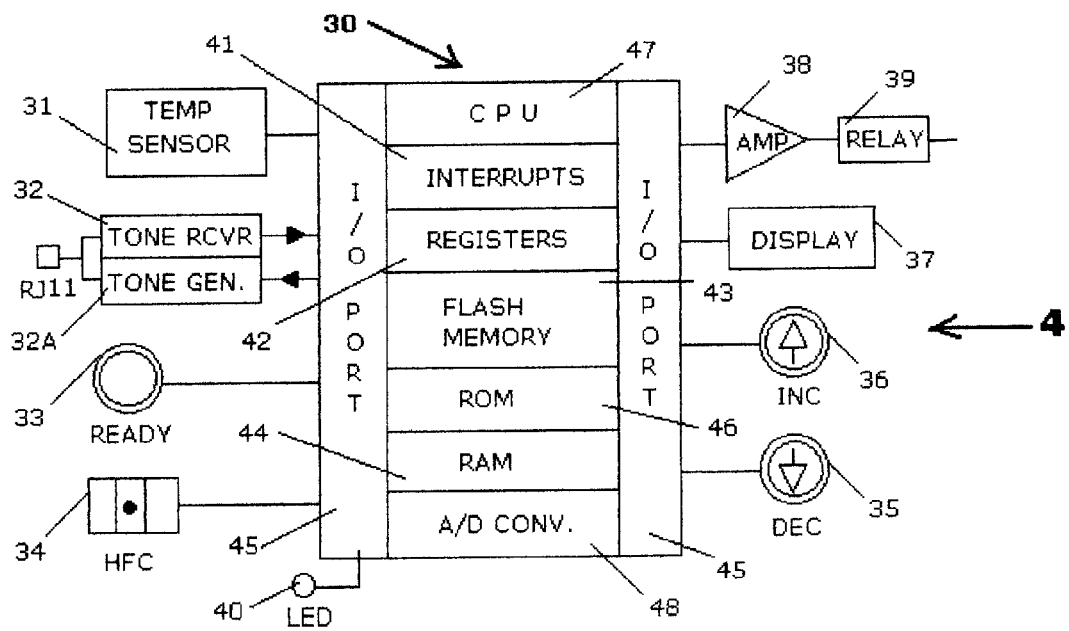
FIG. 4 is a functional block diagram for the local controller box installed in the individual room.

FIG. 3 shows the physical layout diagram of the local controller box, (4) and FIG. 4 shows the functional diagram of the local controller (4).

Temperature sensor (31) reads ambient temperature value every so often and this value is used to compare with the preset limit value, then produces the desired control signal which will determine whether turning on or off the appropriate temperature control devices. National semiconductor, LM75 IC temperature sensor chip can be used for this purpose. AD (Analog Digital) conversion function is imbedded in the chip, and also included are temperature threshold register and hysteresis register. Those additional special functions help the design procedure much easier.

The operations of the tone generator (32A) and the tone receiver (32) are the same as that of the tone generator (19) and the tone receiver (18) of the central controller (2). The tone receiver (32) receives control signals and the preset limit temperature values via telephone lines, converts those values into digital values.

Tone generator converts digital data into DTMF format and transmits the converted data to central controller via the telephone lines. When a housekeeper finishes room cleaning and pushes "READY" (13) button, then the address (Room Number) and the room status data are transmitted to the central controller (2) in the front office.

This operation changes the color of the LED (40) to green from off color indicating that the room is cleaned and ready to accept a guest. HFC (34) (Heating, Fan, and Cooling) switch selects one of three functions. If central heating and cooling system is used, H Heating) and C (Cooling) positions are overridden. If individual units are used in each room, the room guests have control to select their own choice. The guest has the fan option in both situations, central system or individual room unit system.

The room guests have the control to increase or decrease room temperature from the preset limit temperature value set at the central controller. Each pressing "INC" (36) or "DEC" (35) button increases or decreases one degree to the previously set value. Thus, the preset limit temperature values are set at the central controller, then downloaded to the local controller of each individual room, then adjusted by the individual guest based on his or her own feeling of the room environment.

The display unit displays the information:
1) Preset limit temperature value.
2) Ambient temperature value.

The resultant output of the comparison of two values, preset limit temperature value and actual ambient temperature value is the control voltage which is amplified by the amplifier (38) and activates or deactivates relay (39) to turn on or off the heating/cooling unit. The structure of the microcontroller (30) in the local controller is the same as that of the microcontroller (10) in the central controller. Therefore, the operational characteristics for both microcontrollers are the same.

Figure 5:
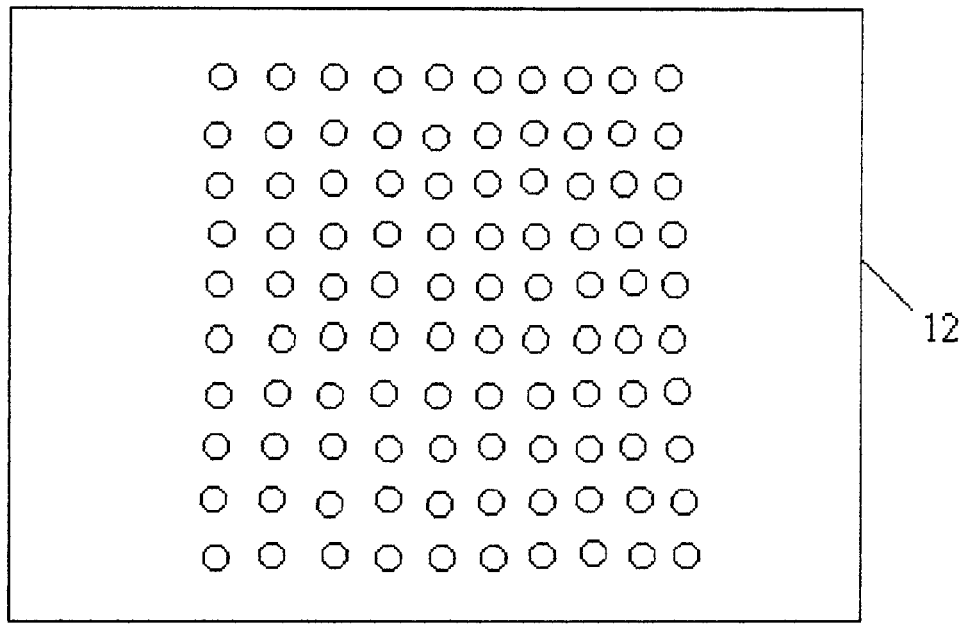
FIG. 5 is an LED Matrix showing the status of rooms located on the central controller board.

FIG. 5 is the exploded layout of the LED Matrix, which is previously explained in detail.

Figure 6:
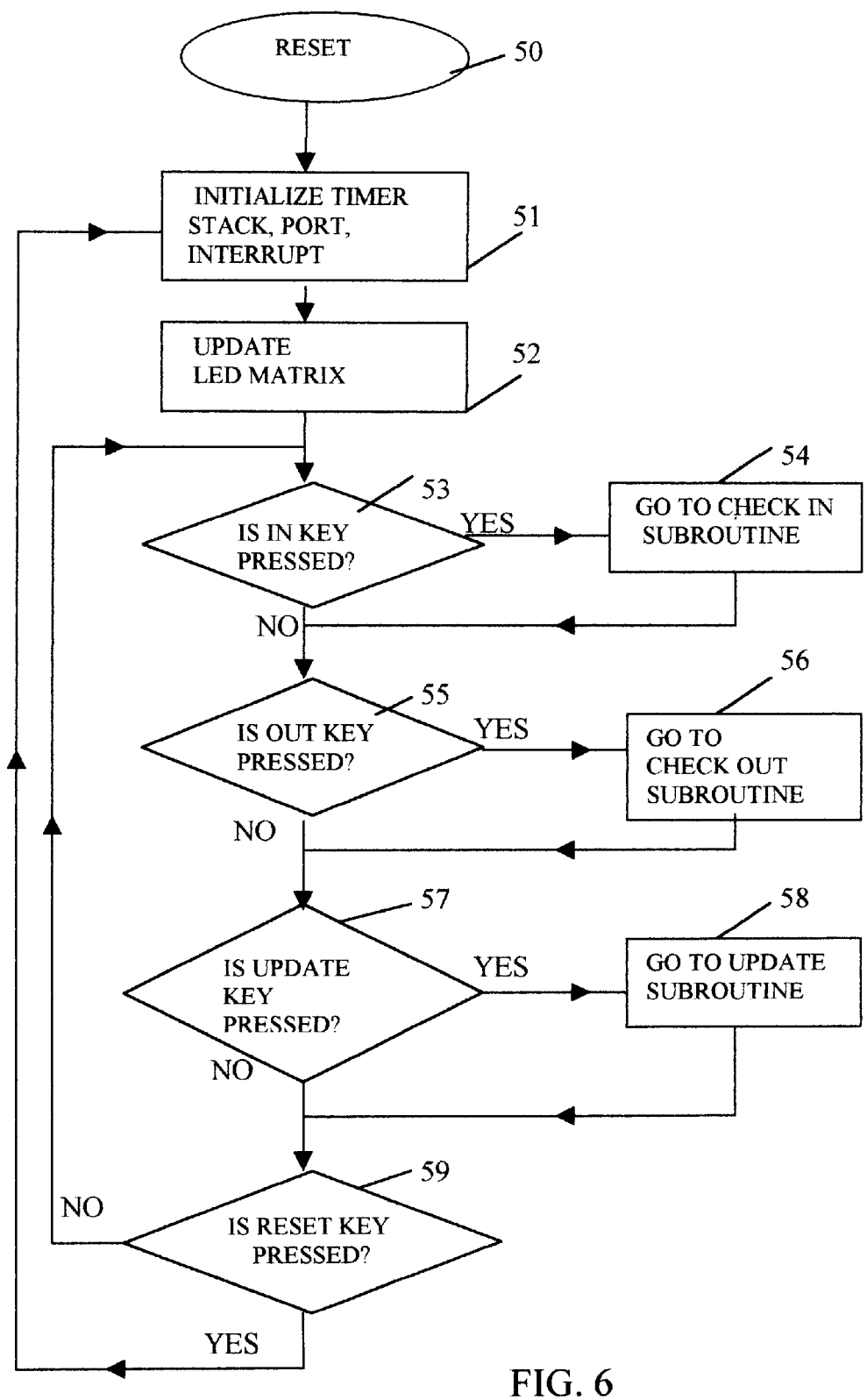
FIG. 6 through FIG. 10 are for the flow charts of the software processing of the microcontroller of the central controller.

FIG. 6 through FIG. 10 are for the flow charts of the software processing of the microcontroller of the central controller and FIG. 11 through FIG. 16 are for that of the local controllers. FIG. 6 is for reset procedure (50), which can be invoked either by power up or pressing "RESET" BUTTON. The procedure initializes the internal components of the microcontroller and polls a function key press. If a function key is pressed the sequence is sent to the appropriate subroutine to take care of the function.

Figure 7:
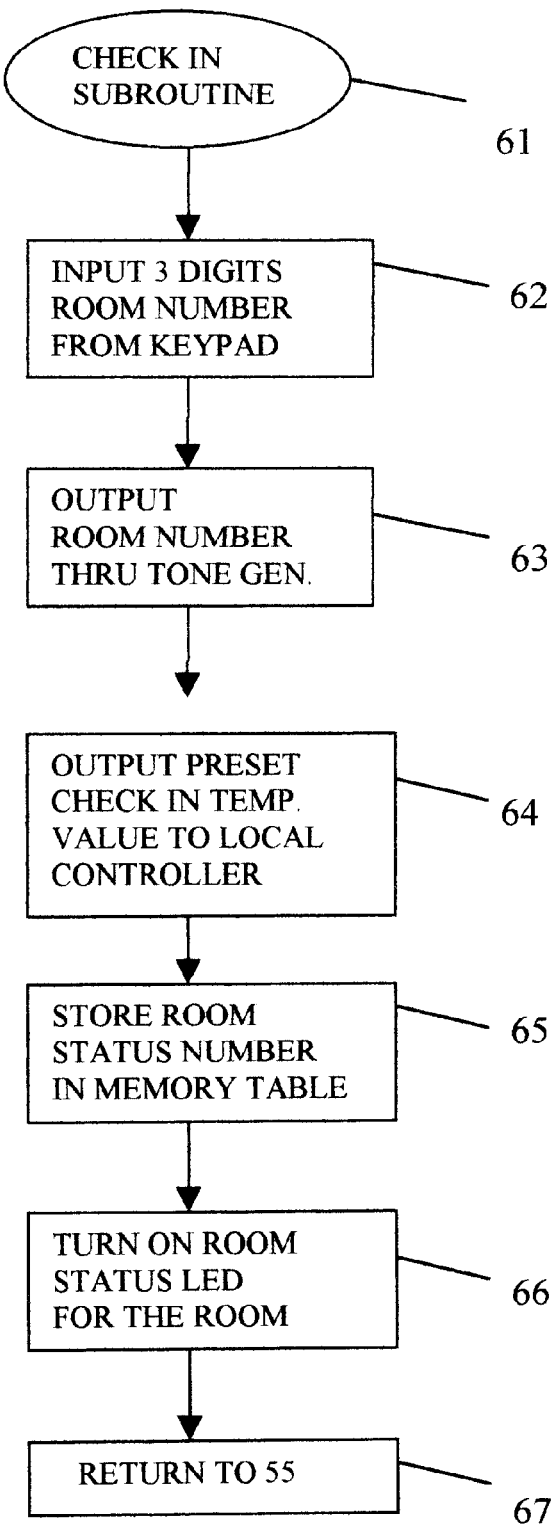

FIG. 7 is the check "IN" procedure (61). When a front clerk presses "IN" key, then the CPU waits and receives a room number from the keypad and sends the preset limit temperature value to the local controller and updates the status LED for the room.

Figure 8:
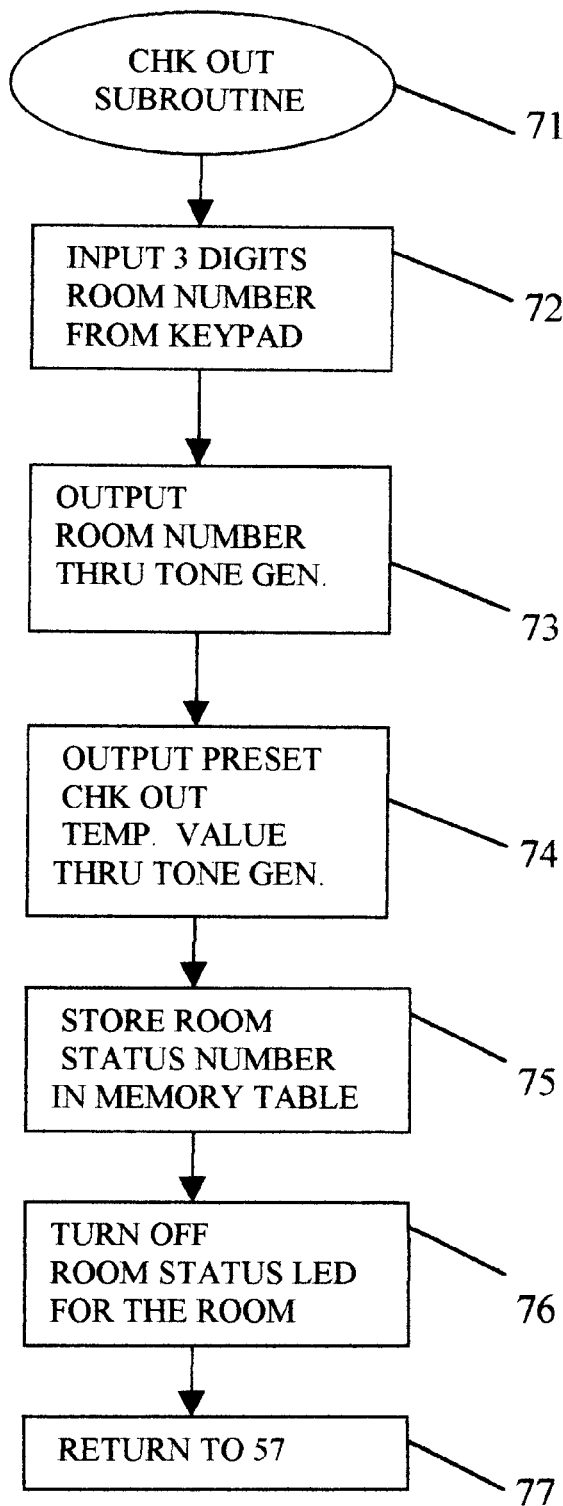

FIG. 8 is the check "OUT" procedure (71). The operation is almost the same as check "IN" procedure except being initiated by the "OUT" button.

Figure 9:
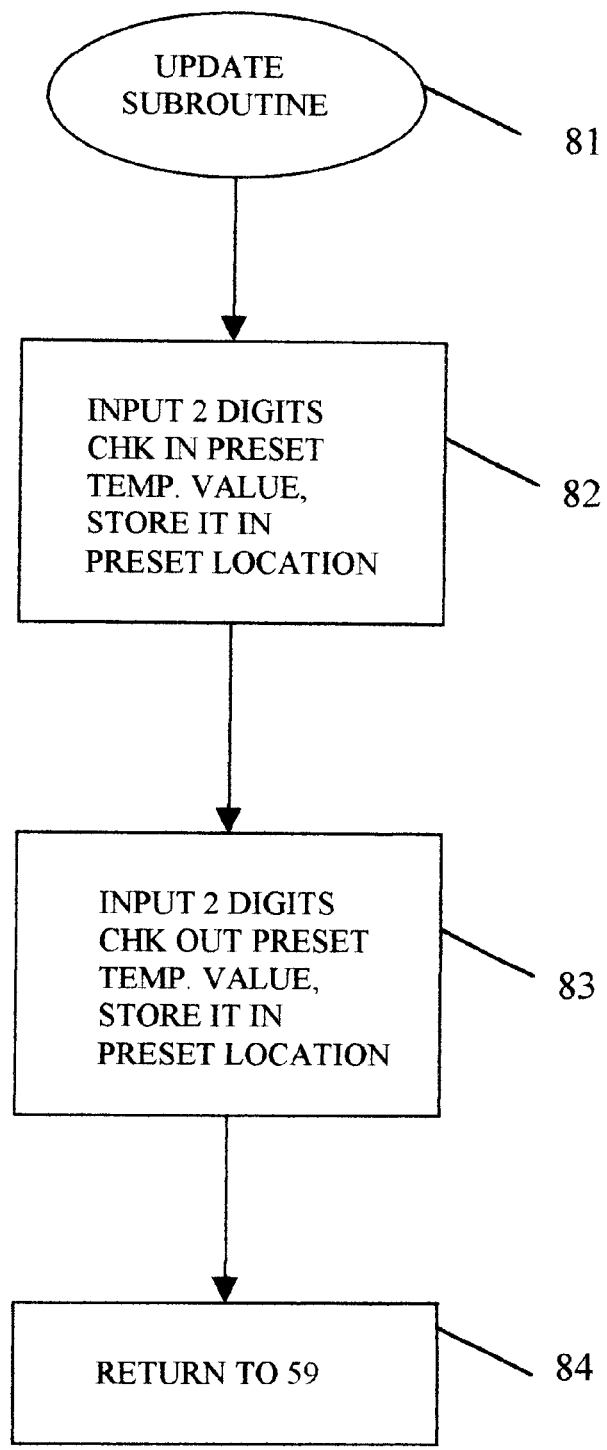

FIG. 9 is the "UPDATE" procedure (81). When the "UPDATE" is pressed, it waits for 2 digit input for the occupied preset limit temperature and for another 2 digits for the vacant preset limit temperature and stores them in the memory.

Figure 10:
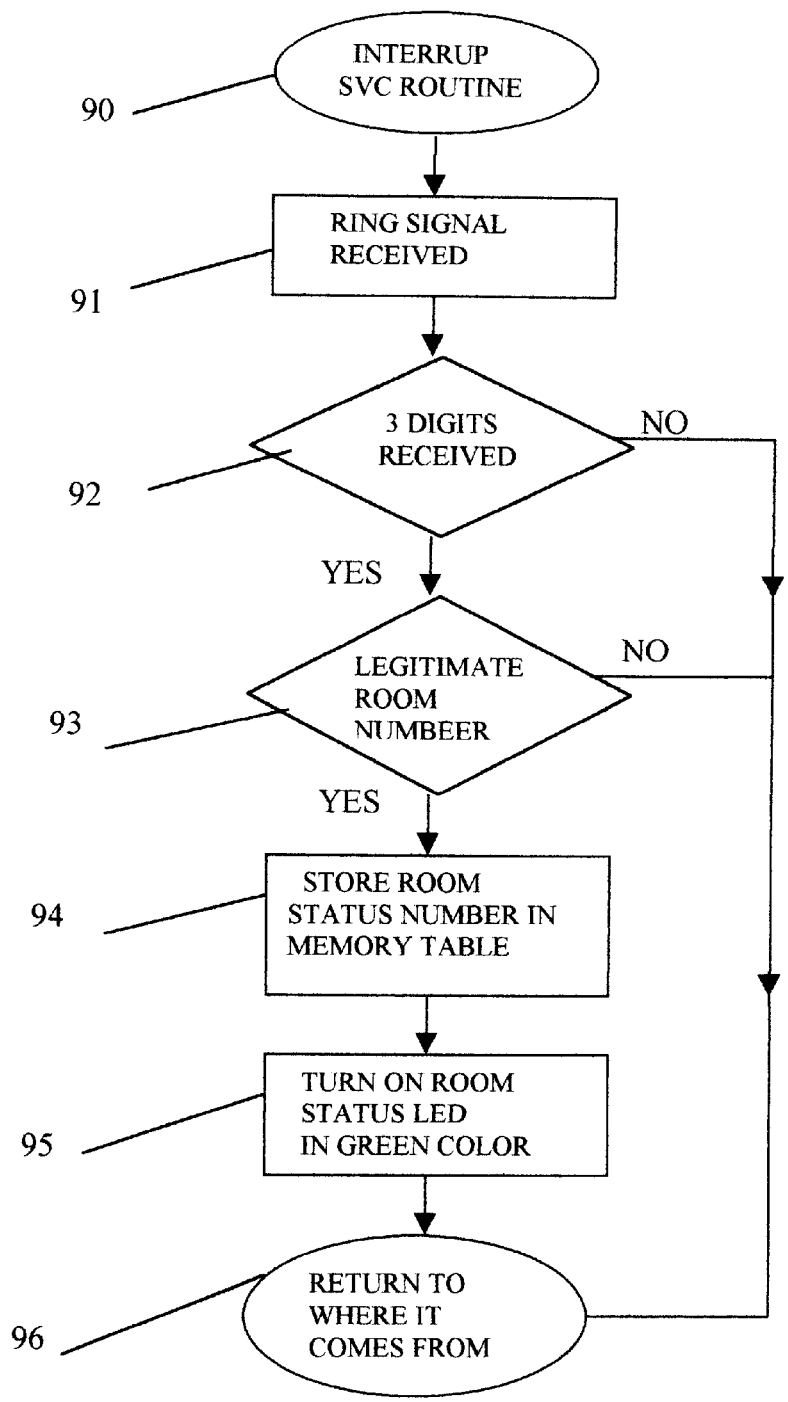

FIG. 10 is the interrupt service routine (90). When ring signal is received, it will initiate a hardware interrupt request, then the CPU starts the interrupt service routine receiving room number and data. According to the data received, updates the room status appropriately.

FIG. 11 through FIG. 16 are for the program flow charts for the micrcontroller of the local controller (4).

Figure 11:
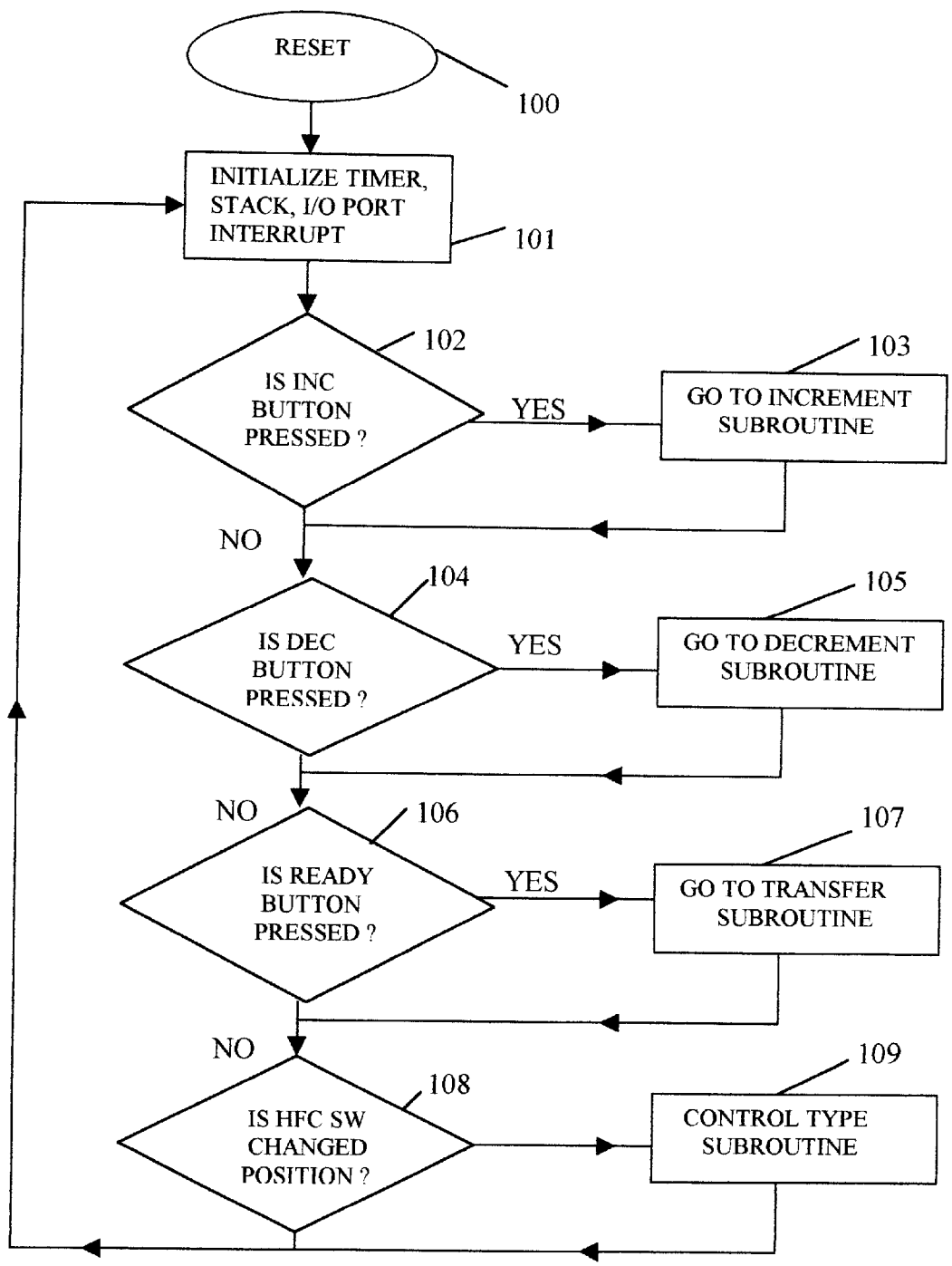
FIG. 11 through FIG. 16 are for the flow charts of the local controller.

FIG. 11 is the reset procedure (100) for the microcontroller (30), the program procedure is the same as that of FIG. 6 (50).

Figure 12:
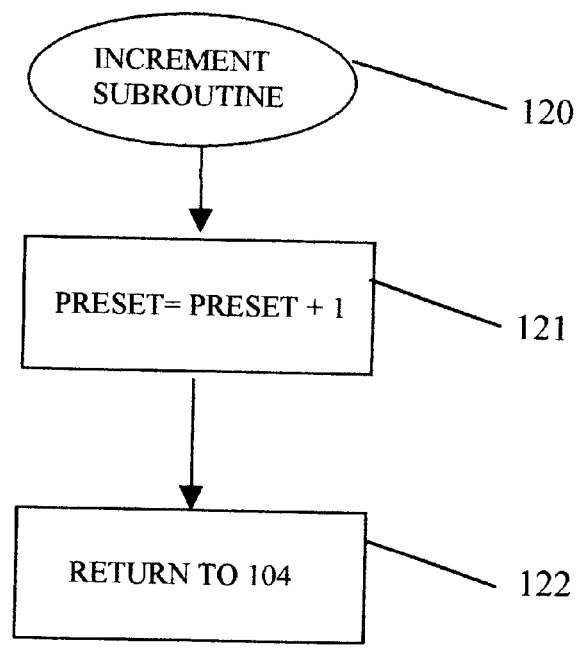

FIG. 12 is the increment service routine (120). When a guest presses the "UP" arrow button on the local controller, the procedure increases one degree to the previously set value and return to the main program.

Figure 13:
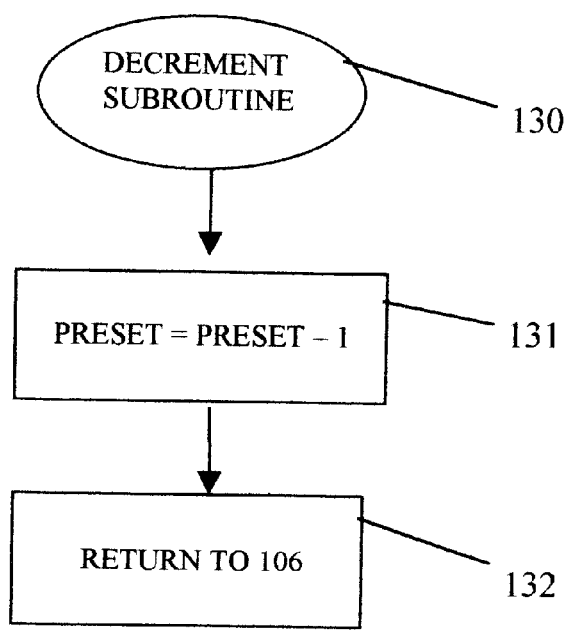

FIG. 13 is the decrement procedure (130). When a guest presses the "DOWN" arrow button on the local controller, the procedure decreases one degree from the previously set value and return to the main program.

Figure 14:
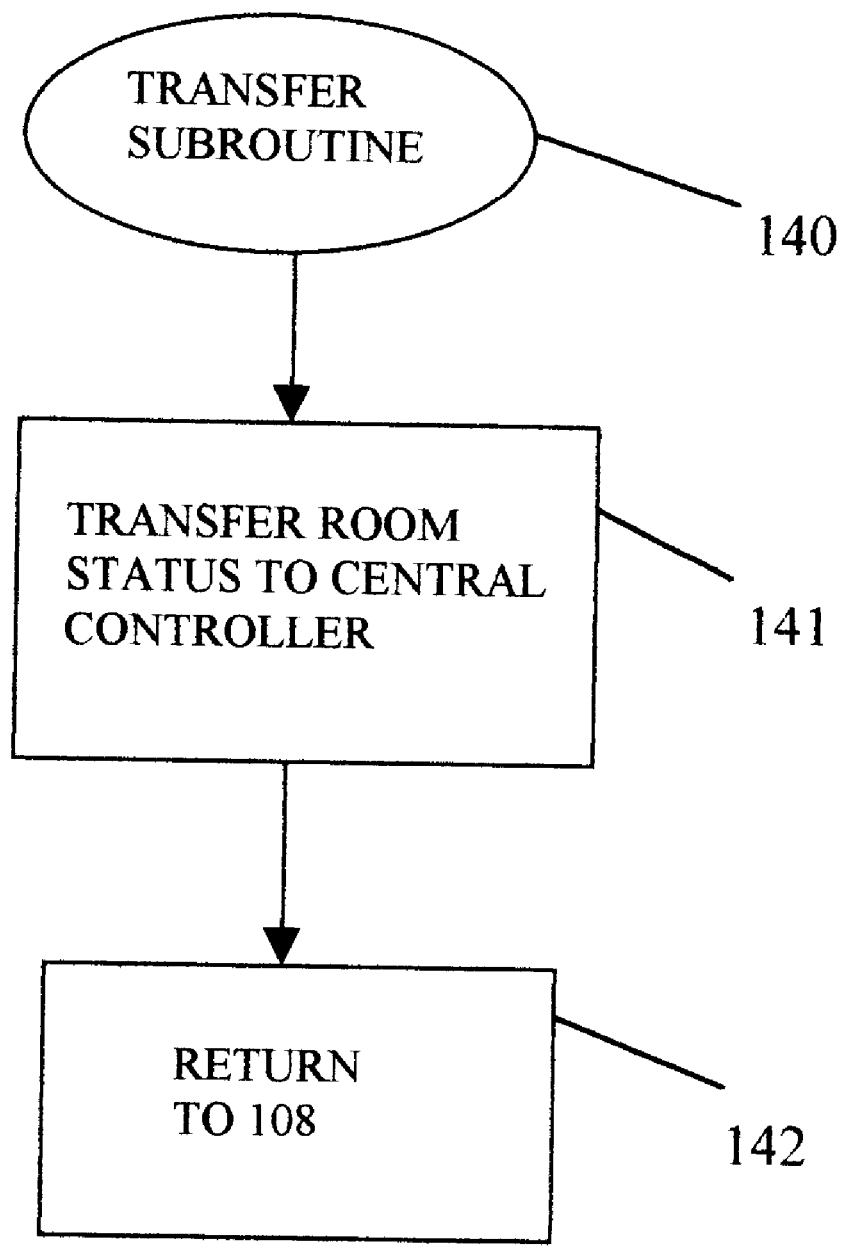
Figure 15:
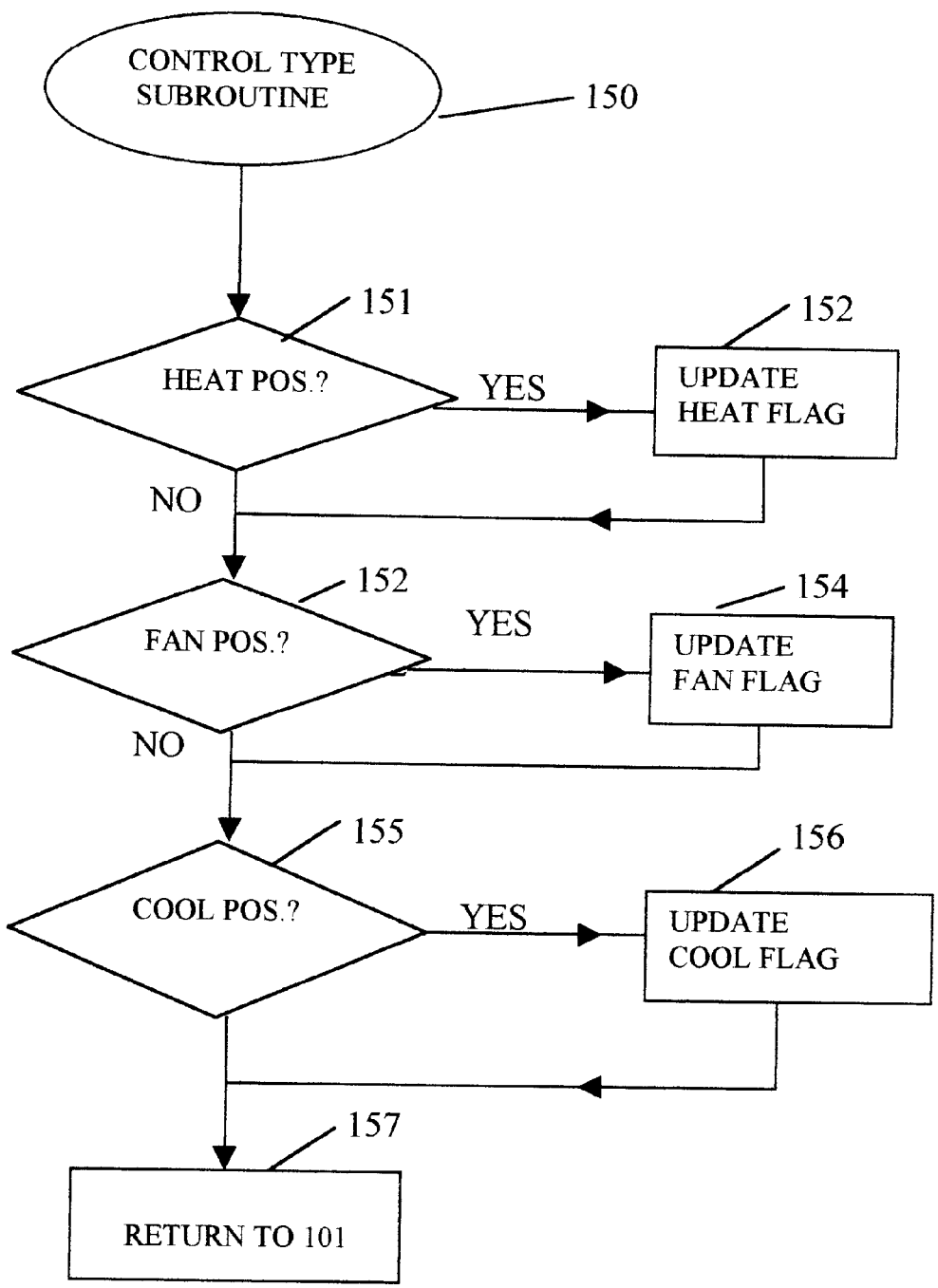

FIG. 14 is the transfer procedure (140). When a room attendant presses the "READY" button, the program sends out the room number and "READY" status data, to the central controller and updates to the "ROOM IS READY" status, setting the LED to the green color. FIG. 15 is the control type subroutine (150). The procedure is polling "HEAT", "FAN", "COOL" positions of the HFC button. Depending upon the button's position, it will set the appropriate flag bit for the position.

Figure 16:
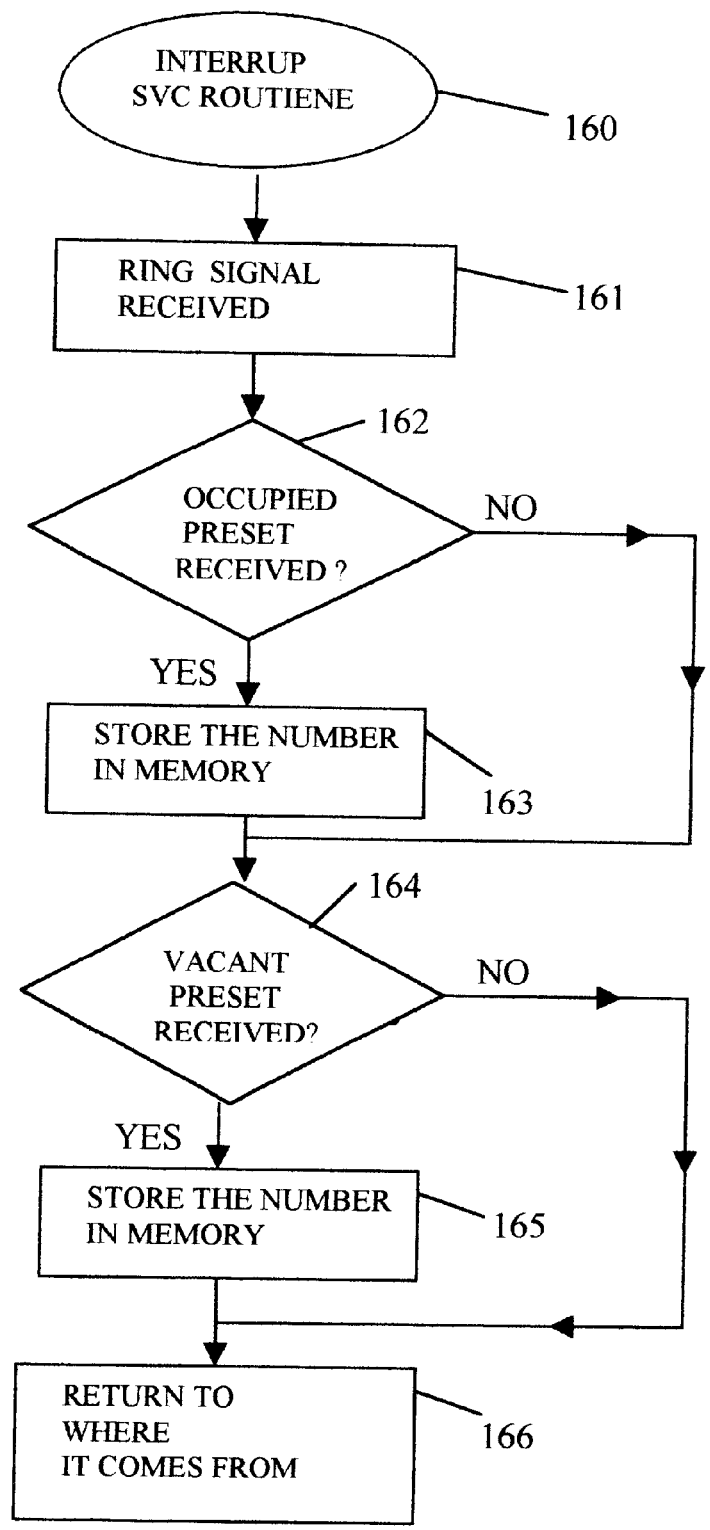

FIG. 16 is the interrupt service routine. The service routine receives appropriate preset limit temperature and updates the room status.

What I claim as my invention is:

1. A centralized automatic energy control system for managing energy efficiently in a hotel or motel facility with multi room environment, the control system comprises:

a central controller means; and plurality of local controller means;

wherein the central controller means for controlling individual room's heating, airconditioning, lightings automatically from a central location further comprising:

a) microcontroller for;
inputting room address number from keypad during check in, check out process of a guest into, or out of, a room,
transferring occupied and vacant preset limit temperatures to a local controller located in each room,
maintaining room status table in memory within the microcontroller,
updating room status LED matrix,
outputting the room address during check in and check out process,
updating preset limit temperatures and keeping them inside memory,
maintaining the programs for the aforementioned functions;

b) LED Matrix means for displaying the room status whether checked out, checked in, or the room is clean by different colors;

c) keypad means for inputting room numbers during check in, or check out process, inputting preset limit temperature values for the occupied and vacant states;

d) function control push buttons defined as IN, OUT, UPDATE, and RESET buttons, for checking in, checking out, updating vacant room limit temperature and occupied room limit temperature, and resetting the system;

e) display means for displaying occupied preset limit temperature value and vacant preset limit temperature value, and displaying room numbers during check in and check out process;

f) tone generator means for converting a digital data to a DTMF data, and transmitting room address and the preset temperature values;

g) tone receiver mean for converting a DTMF data to a digital data, and receiving room status information from local controllers;

h) existing telephone lines for data transmissions between the central controller and the local controllers.

2. The centralized automatic energy control system as claimed in claim 1, wherein said local controller means installed in every room, and controlled by the central controller further comprising:

a) a microcontroller for inputting the preset occupied and vacant limit temperatures during check in, check out processes from the central controller means, generating the control voltage to activate or deactivate heating or cooling relay, maintaining appropriate programs for aforementioned functions;

b) temperature sensor for inputting the measured ambient temperature value which is converted to a digital value by an ADC converter embedded in the microprocessor;

c) tone receiver for converting touch tone signal, DTMF, received via telephone lines to digital data format;

d) tone generator for: converting digital data to touch tone signal, transmitting the status data and room number to central controller;

e) display means for displaying the preset limit temperature value, ambient temperature value on the local controller;

f) a three position switch means defined as HFC switch for selecting either heating, fan, or cooling function;

g) increase and decrease buttons, defined as INC and DEC buttons, to manually increase or decrease a room temperature while the room is occupied;

h) room status report button means defined as READY button for sending a room number and the room status signal to the central controller and disabling the lighting system of the room; and I) a relay and amplifier means for activating or deactivating either heating or cooling unit.

3. Method of automatically controlling temperatures and lightings for all individual rooms in a multi rooms environment from a central controller comprising, steps of:

a) transmitting the preset limit temperature values for the occupied state and the vacant state from the central controller to a local controller via existing telephone lines through tone generator and tone receiver during check in and check out processes;

b) reporting said room status from a local controller to the central controller via telephone lines through tone generator and tone receiver;

c) maintaining a LED Matrix on the central controller for displaying the room occupancy status with one LED per room, said status includes check in, check out, room is clean states, distinguished by the different colors;

d) utilizing the existing telephone lines for the data communications between the central controller located in the front office and the local controllers installed one in each room;

e) displaying a vacant room limit temperature and an occupied room limit temperature values on a display on the central controller;

f) displaying a current room temperature and a room limit temperature values on a display on the local controller;

g) converting a DTMF signal to a digital signal by tone receivers of the central and the local controllers; and h) converting a digital signal to a DTMF signal by tone generators of the central and local controllers.

* * * * *